United States Patent
Offerle et al.

(10) Patent No.: US 10,800,446 B2
(45) Date of Patent: Oct. 13, 2020

(54) METHODS AND APPARATUS TO MODIFY STEERING ASSIST OF A HYDRAULIC POWER STEERING SYSTEM

(71) Applicant: Ford Global Technologies, LLC, Dearborn, MI (US)

(72) Inventors: Timothy Gerard Offerle, Saline, MI (US); Bradley G. Hochrein, Dexter, MI (US); Anand Naik, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 238 days.

(21) Appl. No.: 15/968,442

(22) Filed: May 1, 2018

(65) Prior Publication Data

US 2019/0337555 A1 Nov. 7, 2019

(51) Int. Cl.
*B62D 5/04* (2006.01)
*B62D 5/06* (2006.01)

(52) U.S. Cl.
CPC ......... *B62D 5/0463* (2013.01); *B62D 5/0481* (2013.01); *B62D 5/063* (2013.01)

(58) Field of Classification Search
CPC ...... B62D 5/065; B62D 6/001; B62D 5/0463; B62D 5/063; B62D 5/0481; B62D 5/0469; G05D 17/00; B60D 17/015
See application file for complete search history.

(56) References Cited

U.S. PATENT DOCUMENTS

| | | | | |
|---|---|---|---|---|
| 4,541,499 A * | 9/1985 | Yanai | .................... | B62D 6/00 180/422 |
| 4,830,127 A * | 5/1989 | Ito | ............................ | B62D 6/00 180/446 |
| 4,875,540 A * | 10/1989 | Oshita | ................. | B62D 5/0466 180/446 |
| 5,717,590 A * | 2/1998 | Mihalko | ............. | B62D 5/0463 180/443 |
| 6,336,519 B1 * | 1/2002 | Bohner | ................... | B62D 5/06 180/403 |
| 6,505,703 B2 * | 1/2003 | Stout | ..................... | B62D 6/008 180/402 |
| 6,843,341 B2 | 1/2005 | Grebe et al. | | |
| 6,854,558 B2 * | 2/2005 | Pauly | .................... | B62D 6/002 180/443 |

(Continued)

FOREIGN PATENT DOCUMENTS

| | | |
|---|---|---|
| EP | 0962377 | 11/2005 |
| JP | 2518320 | 7/1996 |

OTHER PUBLICATIONS

Romain Nicolas, Torque Overlay Technology, retrieved from http://www.car-engineer.com/torque-overlay-technology/, posted Jul. 8, 2012, 9 pages.

*Primary Examiner* — Mussa A Shaawat
(74) *Attorney, Agent, or Firm* — Raymond L. Coppiellie; Hanley, Flight & Zimmerman, LLC

(57) ABSTRACT

Methods, apparatus, and articles of manufacture are disclosed to modify a steering assist of a hydraulic power steering system. A disclosed method includes calculating modifier values based on sensor data of a vehicle, calculating a torque modifier value based on the modifier values, and generating a final torque assist based on the torque modifier value and a base torque assist, the final torque assist to be applied to a steering system of the vehicle.

20 Claims, 5 Drawing Sheets

(56) References Cited

U.S. PATENT DOCUMENTS

| | | | |
|---|---|---|---|
| 7,232,007 B2 | 6/2007 | Reuter et al. | |
| 7,835,836 B2 | 11/2010 | Bolourchi et al. | |
| 7,854,292 B2 | 12/2010 | Eisenbarth | |
| 8,996,251 B2* | 3/2015 | Kataoka | B62D 6/008 180/443 |
| 9,511,796 B2* | 12/2016 | Ura | B62D 5/0835 |
| 10,118,638 B2* | 11/2018 | McLaughlin | B62D 6/00 |
| 10,155,531 B2* | 12/2018 | Champagne | B62D 5/0463 |
| 2003/0150665 A1* | 8/2003 | Weeber | B62D 5/008 180/421 |
| 2006/0060412 A1* | 3/2006 | Bolourchi | B62D 5/06 180/443 |
| 2006/0237256 A1* | 10/2006 | Sasaki | B62D 5/065 180/442 |
| 2008/0277187 A1 | 11/2008 | William et al. | |
| 2008/0296084 A1* | 12/2008 | Bohm | B62D 5/065 180/441 |
| 2009/0271074 A1* | 10/2009 | Hulten | B62D 6/003 701/42 |
| 2009/0299574 A1* | 12/2009 | Montosi | B62D 15/029 701/42 |
| 2011/0264321 A1 | 10/2011 | Offerle et al. | |
| 2014/0224565 A1* | 8/2014 | Birsching | B62D 5/0835 180/423 |
| 2015/0047919 A1* | 2/2015 | Dutsky | B62D 5/065 180/421 |
| 2016/0107681 A1* | 4/2016 | Dutsky | B62D 5/09 180/422 |
| 2017/0174252 A1 | 6/2017 | Hochrein et al. | |
| 2017/0359008 A1* | 12/2017 | Kano | H02P 29/64 |
| 2019/0193777 A1* | 6/2019 | Harter, Jr. | B62D 3/04 |

* cited by examiner ically cover the effects of typical vehicle use. For example, when the vehicle is traveling at varying speeds or
METHODS AND APPARATUS TO MODIFY STEERING ASSIST OF A HYDRAULIC POWER STEERING SYSTEM

FIELD OF THE DISCLOSURE

This disclosure relates generally to power steering and, more particularly, to methods and apparatus to modify a steering assist of a hydraulic power steering system.

BACKGROUND

Vehicle hydraulic power steering systems include a hydraulic power steering gear or gearbox operatively coupled to a rack and pinion steering assembly, a steering column, and a closed hydraulic system including an engine-driven hydraulic fluid pump communicatively coupled to the hydraulic power steering gear and a hydraulic fluid reservoir. The steering column transmits inputs to the vehicle steering wheel to the rack and pinion assembly which converts angular rotation of the steering wheel into a lateral motion of the rack to move the vehicle wheels. The hydraulic power steering gear includes a power cylinder and a rotary control valve to direct hydraulic fluid from the hydraulic fluid pump to a selected side of the rack piston, which converts hydraulic pressure into a linear force to move the rack in a desired direction (i.e. to the left or to the right).

SUMMARY

An apparatus disclosed herein includes a torque modifier to calculate modifier values based on sensor data of a vehicle and calculate a torque modifier value based on the modifier values. The apparatus also includes an electronic control unit to generate a final torque assist based on the torque modifier value and a base torque assist. The apparatus further includes a torque overlay unit to apply the final torque assist to a steering system of the vehicle.

A method disclosed herein includes calculating modifier values based on sensor data of a vehicle, calculating a torque modifier value based on the modifier values, and generating a final torque assist based on the torque modifier value and a base torque assist, the final torque assist to be applied to a steering system of the vehicle.

A tangible computer readable storage medium disclosed herein comprises instructions that, when executed, cause a machine to at least calculate modifier values based on sensor data of a vehicle, calculate a torque modifier value based on the modifier values, and generate a final torque assist based on the torque modifier value and a base torque assist, the final torque assist to be applied to a steering system of the vehicle.

Figure 1:
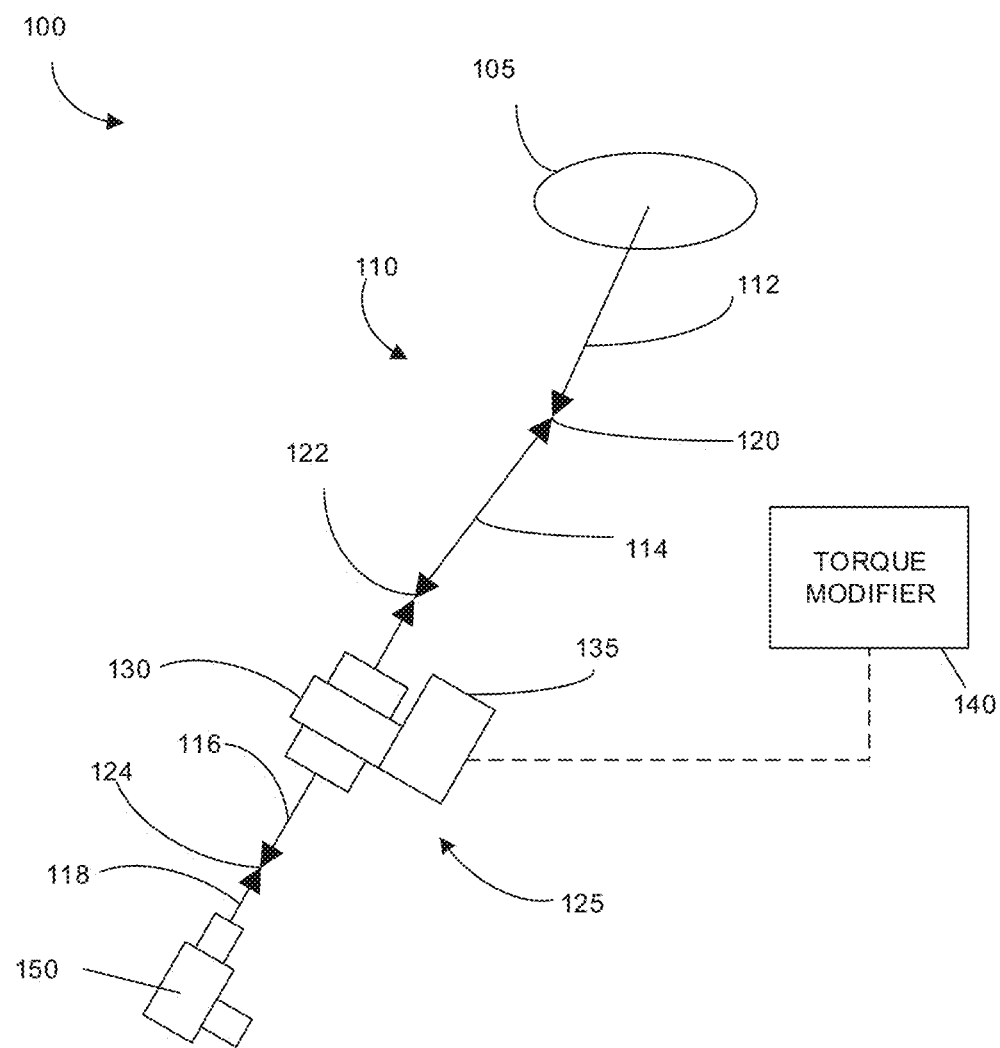
FIG. 1 is an illustration of an example steering system within which the teachings of this disclosure may be implemented.

The figures are not to scale. In general, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers). As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

Vehicle hydraulic power steering systems reduce an amount of driver torque required to rotate a vehicle steering wheel. Hydraulic power steering systems provide higher levels of system pressure to provide higher levels of assistance to the driver. When the wheels reach an end of travel, a maximum pressure is applied. Traditionally, a pressure-relief valve and/or flow control valve of the hydraulic power steering system limits the pressure of the hydraulic system to a predetermined setpoint to ensure that the system pressure does not exceed safety limits.

However, in some cases, the pressure-relief valve and/or flow control valve of the hydraulic system cannot fully compensate for the effects of typical vehicle use. For example, when the vehicle is traveling at varying speeds or at idle speeds (i.e., the throttle pedal is not depressed), the pressure-relief valve and/or flow control valve may not be able to effectively alleviate the undesired effects on the power steering system. Additionally, when the wheels approach and/or reach the end of travel (also referred to herein as end lock position), pressure build-up in the hydraulic power steering system may lead to overheating and/or mechanical stress, which may cause deterioration of parts within the steering system. These undesired effects are not eliminated by the pressure-relief valve and/or flow control valve and, therefore, a more complete solution is desired to fully address the negative effects on the hydraulic power steering system caused, for example, by varying engine speed and/or the vehicle wheels reaching end of travel.

In accordance with the present disclosure, apparatus, methods, and articles of manufacture to modify steering assist of a hydraulic power steering system are disclosed herein. Examples disclosed herein reduce and/or prevent damage and/or deterioration of steering system components due to overheating, increased pressure, and/or variations in driving speed. Examples disclosed herein calculate modifier values based on sensor data of a vehicle, calculate a torque modifier value based on the modifier values, and generate a final torque assist based on the torque modifier value and a base torque assist, where the final torque assist is applied to a steering system of the vehicle. By applying the final torque assist to the steering system of the vehicle, driving conditions resulting in negative effects on the steering system, such as driving near end of travel, may be reduced and/or prevented. In some disclosed examples, the sensor data of the vehicle includes one or more of steering velocity data, steering angle data, steering torque data, vehicle speed data, engine torque data, or engine RPM data. In some disclosed examples, the final torque assist is to be applied by a torque overlay unit coupled to an input shaft of a steering gear of the steering system, the torque overlay unit including an electric motor and a drive mechanism.

In some disclosed examples, one of the modifier values is a steering angle modifier value based on a steering angle of the vehicle, the steering angle modifier value to decrease when the steering angle increases. In some disclosed examples, one of the modifier values is a steering velocity modifier value based on a steering velocity, the steering velocity modifier value to decrease when the steering velocity increases. In some disclosed examples, one of the modifier values is a pressure modifier value based on a calculated steering pressure, the pressure modifier value to decrease when the calculated steering pressure increases. In some disclosed examples, one of the modifier values is an engine RPM modifier value based on a calculated engine performance, the engine RPM modifier value to decrease when the calculated engine performance increases.

FIG. 1 is an illustration of an example steering system 100 within which the teachings of this disclosure may be implemented. In the illustrated example, the steering system 100 is a hydraulic power steering system. In some alternative examples, the steering system 100 may be another power steering system (e.g., an electro-hydraulic steering system). The steering system 100 of the illustrated example includes a steering wheel 105 used to transmit driver inputs to the steering system 100 (e.g. rotating the steering wheel 105). In the illustrated example, the steering wheel 105 is coupled to a steering column 110. The example steering column 110 of the illustrated example includes an upper shaft 112, an upper intermediate shaft 114, a lower intermediate shaft 116, and an input shaft 118. In the illustrated example, the upper shaft 112 is coupled via a first universal joint 120 (e.g. a cardan-type universal joint) to the upper intermediate shaft 114. In the illustrated example, the upper intermediate shaft 114 is additionally coupled via a second universal joint 122 (e.g. a cardan-type universal joint) to the lower intermediate shaft 116. In the illustrated example, the lower intermediate shaft 116 is coupled to the input shaft 118 via a third universal joint 124 (e.g. a cardan-type universal joint). In some other examples, the first universal joint 120, the second universal joint 122, and the third universal joint 124 may be any other coupling means that allow rotary motion. In the illustrated example, a torque overlay unit 125 is coupled to the lower intermediate shaft 116. In some examples, the example torque overlay unit 125 may be directly coupled to the lower intermediate shaft 116 (e.g., via intermediate bracketry).

The torque overlay unit 125 of the illustrated example includes an example drive mechanism 130 and an example electric motor 135. In some examples, the torque overlay unit 125 may include a torque sensor used to measure steering torque applied to the steering column. In some examples, the torque overlay unit 125 may include an electronic control unit (ECU). In some examples, the torque overlay unit 125 may include a housing to enclose the drive mechanism 130, the electric motor 135, the torque sensor, and/or the ECU.

The example drive mechanism 130 mechanically transfers the torque generated by the electric motor 135 to the lower intermediate shaft 116. Alternatively, the drive mechanism 130 may be coupled to any suitable part of the steering system 100. In some examples, the drive mechanism 130 is a belt and pulley system. Alternatively, the drive mechanism 130 may be any suitable means for transferring the generated torque (e.g., a shaft, gears, etc.). In some examples, the torque overlay unit 125 may receive sensor data and/or other inputs to determine a modification or modifications to the torque applied by the electric motor 135. Alternatively, the torque overlay unit 125 may be any electromechanical means of tuning the electric steering assistance applied to the steering system 100.

In the illustrated example, the torque overlay unit 125 controls an amount of torque to be applied by the electric motor 135 to the example steering column 110 using a torque modifier 140. In some examples, the torque modifier 140 may receive sensor data and/or other inputs to determine a modification or modifications to the torque applied by the electric motor 135. In some examples, the torque modifier 140 is controlled by an electronic control unit (ECU).

In the illustrated example, the input shaft 118 is an input shaft of steering gear 150. In some examples, the steering gear 150 includes an output shaft. In some further examples, a pitman arm is coupled to the output shaft of the steering gear 150. In such further examples, the steering gear 150 may be coupled to steering linkages and tires of a vehicle via the pitman arm. In some examples, the steering gear 150 may include a rotary control valve or a spool valve and/or a power cylinder to direct a flow of hydraulic fluid. In some examples, the steering gear 150 transforms the rotational motion of the example input shaft 118 into a lateral force (e.g. by use of a rack and pinion, recirculating ball gear, etc.). In some examples, the hydraulic fluid directed by the steering gear 150 may be used to exert an assisting force on the steering linkages of the vehicle (e.g., by use of a piston cylinder). The lateral force may turn a wheel or wheels of a vehicle, thus turning the vehicle in a desired direction.

Figure 2:
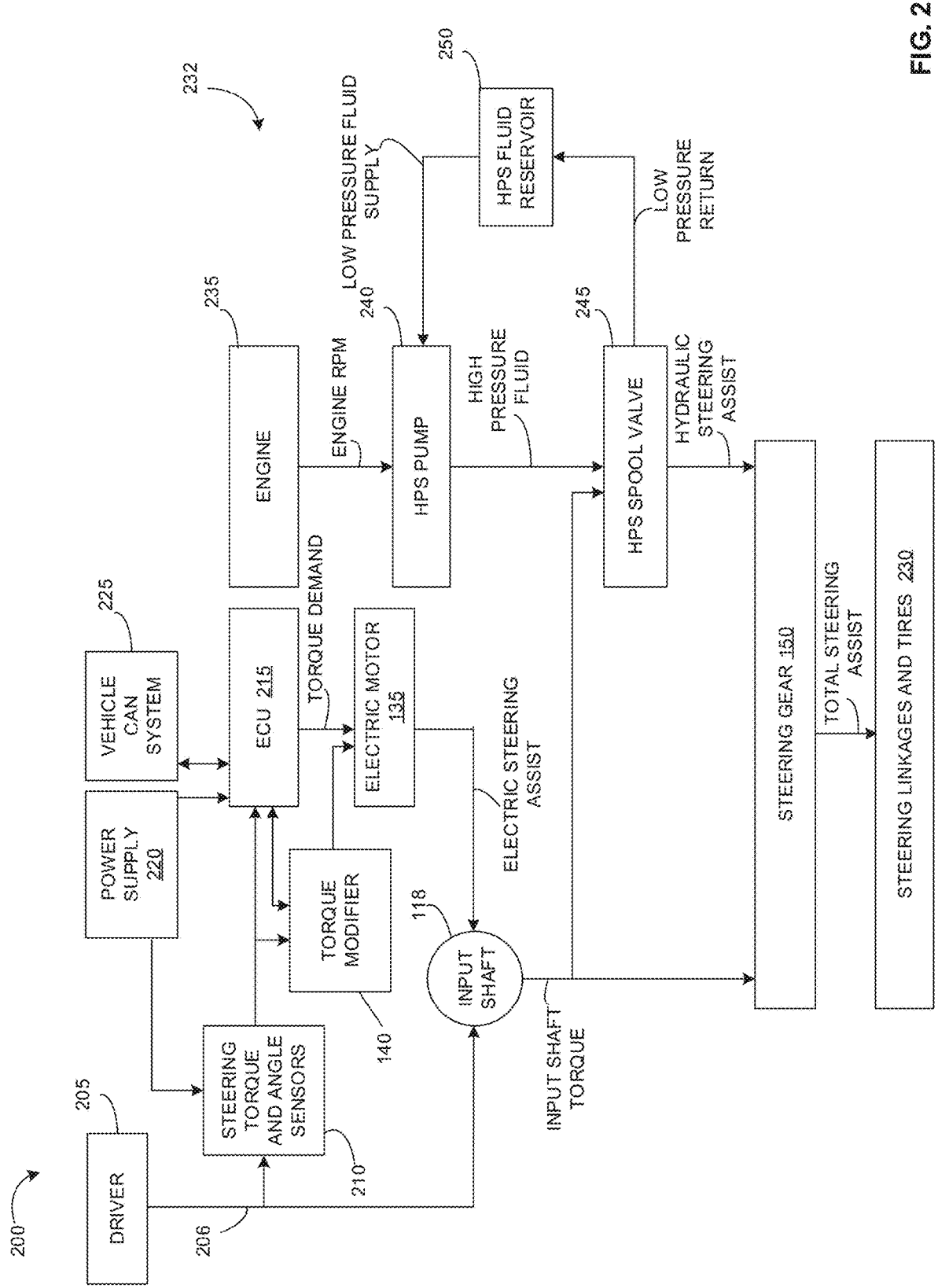
FIG. 2 is a block diagram representative of an example electro-hydraulic steering system in which a torque modifier may be implemented.

FIG. 2 is a block diagram representative of an example electro-hydraulic steering system 200 in which a torque modifier such as the example torque modifier 140 of FIG. 1 may be implemented. The example electro-hydraulic steering system 200 may be implemented to modify an amount of steering assist applied by an electric steering assist actuator, such as the example torque overlay unit 125 of FIG. 1.

The example electro-hydraulic steering system 200 receives, from a driver 205, driver inputs 206 (e.g. turning a steering wheel such as the example steering wheel 105 of FIG. 1). In some examples, the driver inputs 206 may be modifications to a steering angle, a steering torque, and/or any other measurable characteristic (e.g., steering velocity, vehicle speed, etc.). In the illustrated example, the driver inputs 206 may be measured by steering torque and angle sensors 210. In some examples, additional sensors may be included to measure other changes caused by the driver inputs 206 (e.g., an engine torque sensor, a tachometer, etc.).

In the illustrated example, the steering torque and angle sensors 210 output sensor data to an electronic control unit (ECU) 215 and/or the example torque modifier 140. In some examples, the ECU 215 may control the torque modifier 140. In some examples, the torque modifier 140 and/or the ECU 215 may be included in the example torque overlay unit 125 of FIG. 1. In the illustrated example, the steering torque and angle sensors 210 and the ECU 215 are powered by an example power supply 220. In the illustrated example, the ECU 215 is additionally connected to an example vehicle Controller Area Network (CAN) system 225. In some examples, the vehicle CAN system 225 allows the ECU 215 and other devices (e.g. the steering torque and angle sensors 210, an engine control unit, etc.) to communicate without a host computer.

In the illustrated example, the ECU 215 and the torque modifier 140 may communicate with one another. In the illustrated example, the torque modifier 140 and/or the ECU 215 are communicatively coupled to an example electric motor 135. In some examples, the torque modifier 140 and the ECU 215 may be electrically coupled to the example electric motor 135. In some examples, the electric motor 135 may be included in the example torque overlay unit 125 of FIG. 1. In some examples, the ECU 215 may output a torque demand to the electric motor 135 indicative of a desired torque output from the electric motor 135. In some further examples, the torque modifier 140 may modify the torque demand of the ECU 215 based on input data and/or other vehicle characteristics (e.g. steering angle, steering torque, engine performance, etc.). In such examples, the modification to the torque demand may modify the torque output of the electric motor 135.

In the illustrated example, the electric motor 135 applies a torque, herein referred to as an electric steering assist, to the example input shaft 118 of FIG. 1. In some examples, the electric motor 135 is directly (e.g. via a belt and pulley system, a gear coupling mechanism, etc.) coupled to a drive mechanism, such as the example drive mechanism 130 of FIG. 1. In such examples, the drive mechanism may be directly coupled (e.g. via brackets) to a steering column, such as the example steering column 110 of FIG. 1. The electric steering assist applied by the electric motor 135 of the illustrated example may therefore be transferred to the input shaft 118 through the example drive mechanism 130 of FIG. 1. In the illustrated example, the driver inputs 206 are also directly applied to the example input shaft 118.

In the illustrated example, the input shaft 118 applies an input shaft torque to the example steering gear 150 of FIG. 1. In some examples, the input shaft torque is a combination (e.g., a summation) of the driver inputs 206 and the electric steering assist of the electric motor 135. In the illustrated example, the steering gear 150 is coupled to steering linkages and tires 230. In some examples, the steering gear 150 may include an output shaft. In some further examples, a pitman arm may be coupled to the output shaft of the steering gear 150 and may connect the steering gear 150 to the steering linkages and tires 230. In such examples, the steering gear 150 may transform a rotational motion of the example input shaft 118 into a lateral force (e.g. by use of a rack and pinion, recirculating ball gear, etc.). The lateral force may be applied to the steering linkages and tires 230 to turn a wheel or wheels of a vehicle.

In the illustrated example, the example electro-hydraulic steering system 200 also includes an example hydraulic power steering system 232. In the illustrated example, the hydraulic power steering (HPS) system 232 includes an example engine 235, an example HPS pump 240, an example HPS spool valve 245, and an example HPS fluid reservoir 250. In the illustrated example, the engine 235 drives the HPS pump 240. In some examples, the engine 235 is operatively coupled to the HPS pump 240 via a belt and pulley system. In some examples, the HPS pump 240 is a rotary-vane pump. In the illustrated example, the HPS pump 240 is also connected to the HPS spool valve 245. In the illustrated example, the HPS pump 240 is connected to the HPS fluid reservoir 250. In some examples, the HPS pump 240 is connected to the HPS fluid reservoir 250 via a return line.

In the illustrated example, the HPS pump 240 pumps high-pressure fluid (e.g., hydraulic fluid such as a mineral oil or silicone-based fluid) to the HPS spool valve 245. In the illustrated example, the HPS spool valve 245 returns low-pressure fluid to the HPS fluid reservoir 250. In the illustrated example, the HPS fluid reservoir 250 supplies the HPS pump 240 with low-pressure fluid. The low-pressure fluid supply may then be used by the HPS pump 240.

In the illustrated example, the input shaft 118 applies the input shaft torque to the HPS spool valve 245. The input shaft torque may turn the example HPS spool valve 245, opening fluid channels for the high-pressure fluid to flow through. In some examples, the high-pressure fluid is directed to a piston within a cylinder (e.g., a double-acting piston cylinder) by the HPS spool valve 245 (e.g., by opening fluid channels). In such examples, the HPS spool valve 245 directs the high-pressure fluid to one side of the piston based on a direction in which the steering wheel 105 is turned (e.g., to the left or to the right). The high-pressure fluid exerts a force on the piston, thereby applying a hydraulic steering assist to the steering gear 150. In some examples, the HPS spool valve 245 directs more high-pressure fluid when the steering wheel 105 is turned further (e.g., by further opening the fluid channels), thereby increasing the hydraulic steering assist. Alternatively, the hydraulic steering assist decreases when the steering wheel 105 is turned back toward its original position. In the illustrated example, the steering gear 150 then applies a total steering assist to the steering linkages and tires 230 based on the hydraulic steering assist from the HPS system 232 and/or the input shaft torque, thus turning the wheels of the vehicle. In some examples, the total steering assist includes the driver inputs 206, the electric steering assist, and the hydraulic steering assist.

Figure 3:
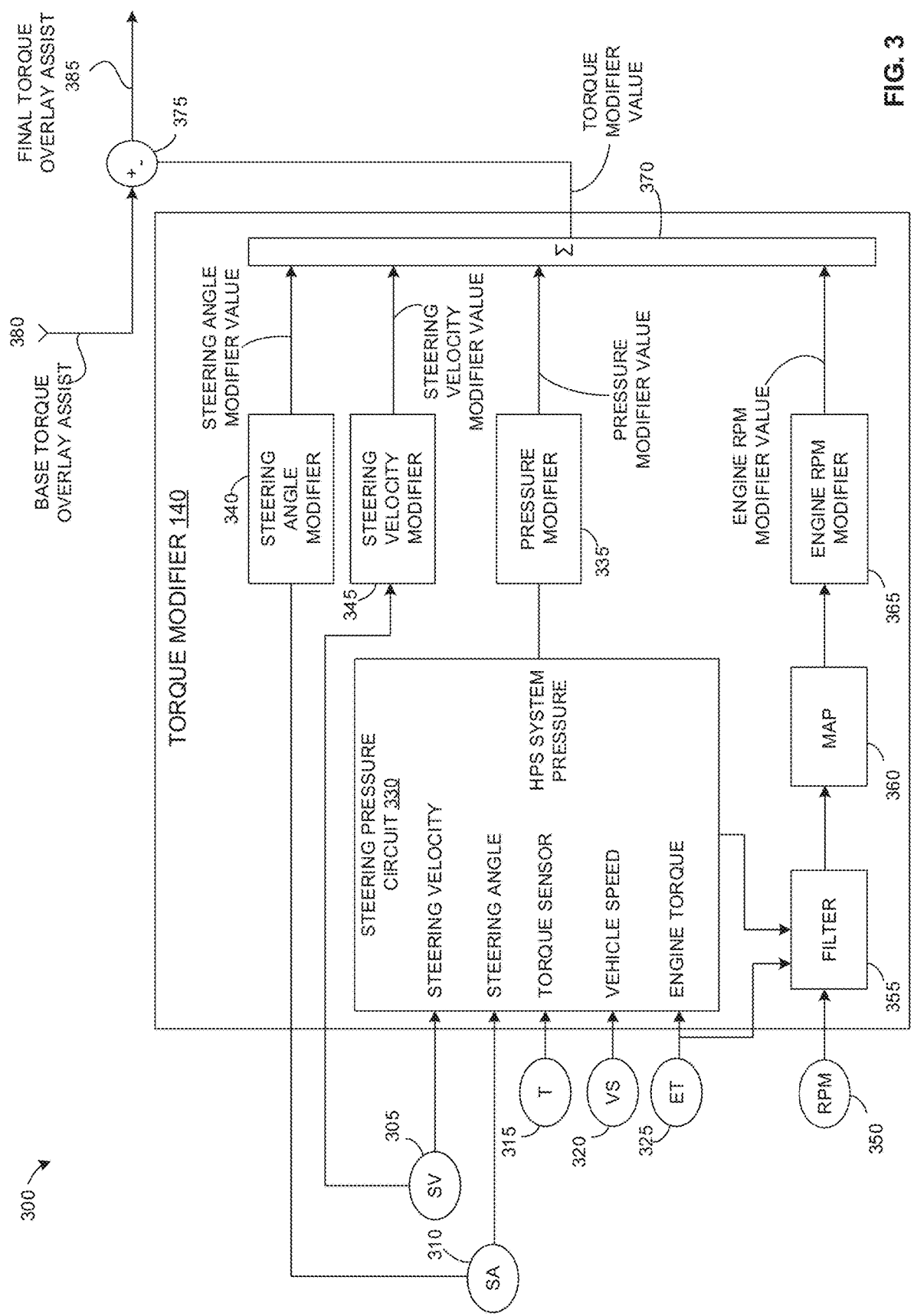
FIG. 3 is a block diagram of an example torque overlay system.

FIG. 3 is a block diagram of an example torque overlay system 300. In some examples, the torque overlay system 300 may be controlled by an electronic control unit (ECU), such as the example ECU 215 of FIG. 2. In the illustrated example, the torque overlay system 300 includes the example torque modifier 140 of FIGS. 1 and 2. The torque modifier 140 receives data from each of a steering velocity sensor 305, a steering angle sensor 310, a torque sensor 315, a vehicle speed sensor 320, an engine torque sensor 325, and an RPM input 350. In some examples, the torque sensor 315 is coupled to an input shaft of a steering system, such as the example input shaft 118 of FIG. 1. In some other examples, the torque sensor 315 is coupled to an intermediate shaft of a steering system, such as the example lower intermediate shaft 116 of FIG. 1. In some examples, the torque modifier 140 of the torque overlay system 300 may also receive data from other sensors (e.g., a pressure sensor).

In the illustrated example, a steering pressure circuit 330 may calculate a steering pressure (i.e., a pressure to be applied to a steering gear such as the example steering gear 150 of FIG. 1) upon receiving input data from the steering velocity sensor 305, the steering angle sensor 310, the torque sensor 315, the vehicle speed sensor 320, and the engine torque sensor 325. In some examples, the steering pressure circuit 330 may compute the steering pressure using the input data from any combination of the sensors 305-325 and/or other input data (e.g., the RPM input 350). For example, a steering gear performance may be known (e.g., from performance characteristics at a given steering angle and steering velocity) and compared to pump flow (e.g., from a hydraulic pump of a hydraulic power steering system, such as the HPS pump 240 of FIG. 2) and steering torque (i.e., the torque on a steering column, such as the example steering column 110 of FIG. 1). In some such examples, the steering torque may be found via the torque sensor 315. The pump flow may be known based on a relationship between pump flow and engine RPM (e.g., an engine drives the flow of a hydraulic pump). When the relationships between pump flow, steering torque, and steering gear performance are known, the steering pressure may be calculated by the example steering pressure circuit 330. In some alternative examples, the example steering pressure circuit 330 may calculate the steering pressure using alternative relationships and/or methods.

In the illustrated example, the steering pressure circuit 330 may output the steering pressure to a pressure modifier 335. The pressure modifier 335 of the illustrated example may calculate a pressure modifier value based on the steering pressure output by the steering pressure circuit 330. In some examples, the pressure modifier value calculated by the pressure modifier 335 may decrease when the steering pressure increases. In some other examples, the pressure modifier value may increase when steering pressure decreases. For example, a high steering pressure may be computed by the steering pressure circuit 330 (e.g. if a driver is driving on a high-friction surface such as brushed concrete). In such examples, the pressure modifier 335 may reduce the pressure modifier value based on the high pressure output by the steering pressure circuit 330. A reduction in the pressure modifier value may lead to a reduction of torque applied by an electric motor, such as the example electric motor 135 of FIG. 1, to an input shaft of a steering system (e.g. the example steering system 100). In some examples, calculating the pressure modifier value may include using a look-up table.

In the illustrated example, a steering angle modifier 340 receives input data from the steering angle sensor 310. The steering angle modifier 340 of the illustrated example may output a steering angle modifier value based on a steering angle of a steering wheel of a vehicle (e.g., the example steering wheel 105 of FIG. 1). In some examples, the steering angle may be compared to an end lock position, the end lock position being the largest possible steering angle for a vehicle steering system (i.e., a point at which the example steering wheel 105 may rotate no further). In some examples, the steering angle modifier 340 may decrease the steering angle modifier value when the steering angle increases (e.g. approaches the end lock position). In other examples, the steering angle modifier 340 may increase the steering angle modifier value when the steering angle decreases (e.g. moves in the opposite direction of the end lock position). In some examples, calculating the steering angle modifier value may include using a look-up table.

In the illustrated example, a steering velocity modifier 345 may receive input data from the steering velocity sensor 305. The steering velocity modifier 345 may increase or decrease a steering velocity modifier value based on steering velocity (e.g. output from the steering velocity sensor 305). For example, if a wheel or wheels of a vehicle approach an end lock position at a high steering velocity (e.g. a steering wheel is rotated quickly by a driver), the steering velocity modifier 345 may decrease the steering velocity modifier value. In some alternative examples, the steering velocity modifier value may increase when steering velocity decreases. In some examples, a decrease in the steering velocity modifier value may ensure that the driver cannot reach the end lock position with a high steering velocity. In such examples, a decrease in the steering velocity modifier value may prevent a large, sudden increase in steering pressure of the example steering system 100. In some examples, calculating the steering velocity modifier value may include using a look-up table.

In the illustrated example, the engine torque sensor 325, the steering pressure of the steering pressure circuit 330, and the RPM input 350 serve as inputs to a filter 355. The example filter 355 filters the inputs to eliminate large, sudden changes in input data that would reduce stability in an engine RPM modifier 365, which is discussed in more detail below.

In the illustrated example, the filter 355 outputs filtered data (i.e., engine torque data, steering pressure data, and RPM data) to a map 360. The map 360 monitors the performance of an engine such as the example engine 235 of FIG. 2. In some examples, the map 360 may use a look-up table to map the performance of the example engine 235. In some examples, the map 360 may be based on inputs from only the RPM input 350.

In the illustrated example, the output of the map 360 serves as an input into an engine RPM modifier 365. The engine RPM modifier 365 of the illustrated example outputs an engine RPM modifier value that may increase or decrease based on the map 360, and, therefore, based on the performance of the example engine 235. In some examples, the engine RPM modifier value may increase when the map 360 indicates the engine performance has decreased. For example, when the example RPM input 350 decreases, the example map 360 may indicate a decrease in performance of the example engine 235, and the engine RPM modifier 365 increases in value. In an alternative example, when the example RPM input 350 increases, the engine RPM modifier 365 may decrease.

In the illustrated example, a summation block 370 may combine the pressure modifier 335, the steering angle modifier 340, the steering velocity modifier 345, and/or the engine RPM modifier 365. In some examples, the summation block 370 may receive only a single modifier value (e.g. only the engine RPM modifier 365). In some other examples, the summation block 370 may receive two or more modifier values. As used herein, the term modifier values is used to describe values calculated based on one or more inputs to a vehicle steering system and indicative of a modification to an amount of torque supplied by a supplemental assist actuator (e.g., the example torque overlay unit 125 of FIG. 1) to a steering system. In the illustrated example, a torque modifier value is output by the example summation block 370.

In the illustrated example, one or more of the pressure modifier 335, the steering angle modifier 340, the steering velocity modifier 345, and/or the engine RPM modifier 365 may be combined in numerous configurations at the summation block 370. In some examples, the steering angle modifier 340 may be combined with the steering velocity modifier 345 and/or the pressure modifier 335. For example, a wheel or wheels of a vehicle may approach an end lock position, thus increasing the steering angle. If the steering angle increases at a high velocity, both the steering angle modifier value and the steering velocity modifier value may decrease. The example summation block 370 may sum the respective modifier values, thus decreasing the torque modifier value. Further, the pressure modifier 335 may also output the pressure modifier value to the summation block 370. In a case in which a high steering pressure is calculated by the steering pressure circuit 330 (e.g. the vehicle is on a high friction surface), the pressure modifier value may decrease, further decreasing the torque modifier value. In some other examples, any of the steering angle modifier value, the steering velocity modifier value, the pressure modifier value, and/or the engine RPM modifier value may be combined to calculate the torque modifier value. The summation of the one or more modifier values at the summation block 370 allows the torque modifier value to be defined based on multiple inputs.

In the illustrated example, a combination block 375 adds the output of the summation block 370 to an example base torque overlay assist 380. In some alternative examples, the combination block 375 may combine the output of the summation block 370 and the base torque overlay assist 380 using other methods (e.g., multiplication, averaging, etc.). The base torque overlay assist 380 (also referred to herein as a base torque assist) is a torque output of the example torque overlay unit 125 applied to an input shaft of a steering system (e.g., the example steering system 100 of FIG. 1) when no modifications are made by the torque modifier 140.

In the illustrated example, a final torque overlay assist 385 is generated based on the addition of the base torque overlay assist 380 and the torque modifier value at combination block 375. In some examples, the final torque overlay assist 385 (also referred to herein as a final torque assist) is indicative of the torque to be applied by the example torque overlay unit 125. In some examples, the final torque overlay assist 385 may have a positive value that is higher than the base torque overlay assist 380. In such examples, the example torque overlay unit 125 may increase the torque applied to the example steering column 110 based on the positive final torque overlay assist 385. In some other examples, the final torque overlay assist 385 may be lower than the example base torque overlay assist 380 (e.g., when the torque modifier value is negative). In such other examples, the example torque overlay unit 125 may decrease the torque applied to the example steering column 110. In some further examples, the final torque overlay assist 385 may have a negative value (e.g., the torque modifier value is negative and greater in magnitude than the base torque overlay assist 380). In such further examples, the example torque overlay unit 125 may reverse the direction of the torque applied to the example steering column 110, thus opposing a driver input to the example steering wheel 105 (e.g., making it more difficult for the driver to turn the example steering wheel 105 further and/or hold a current steering wheel position).

Figure 4:
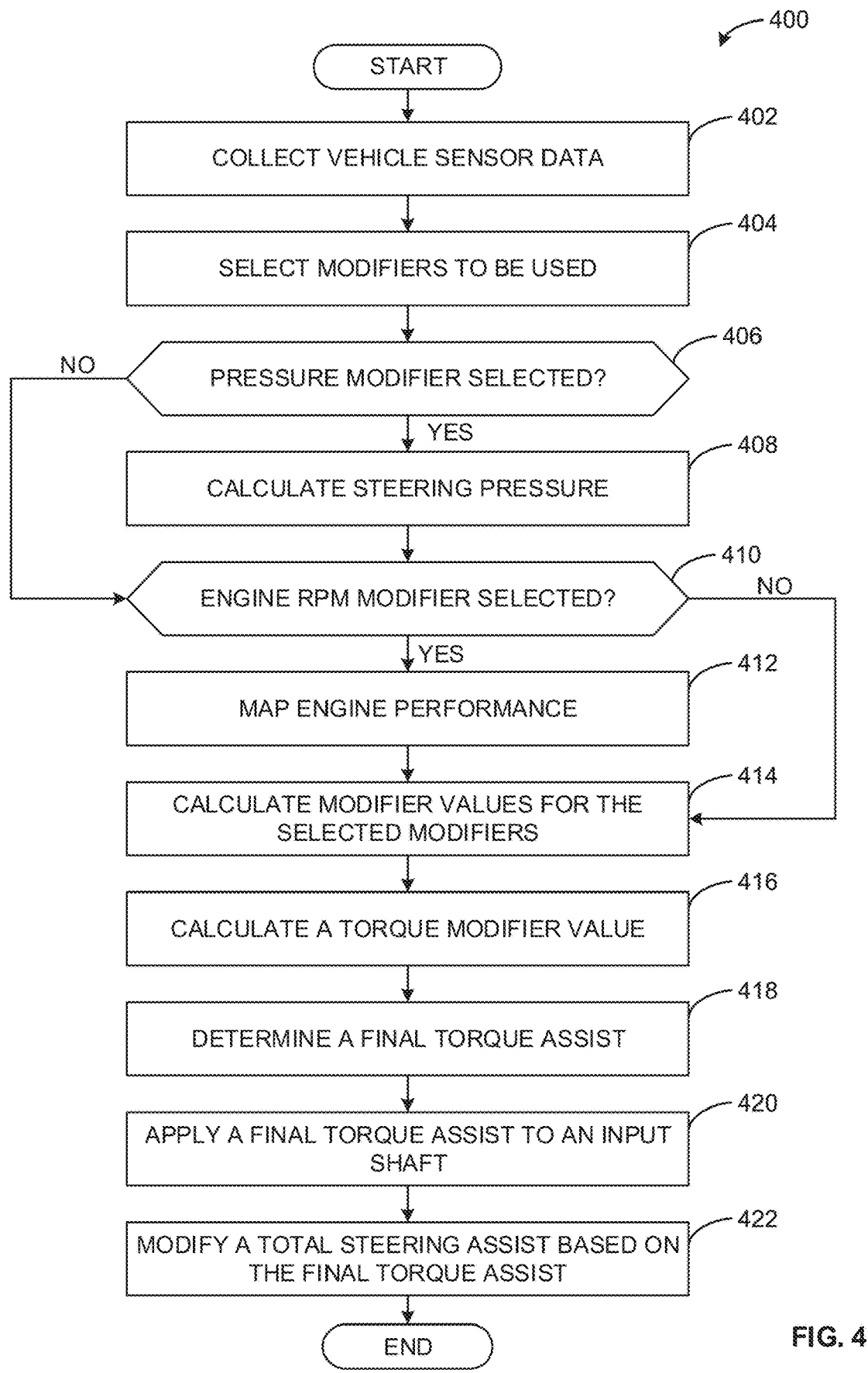
FIG. 4 is a flow diagram of an example method that can be used to implement the example torque overlay system of FIG. 3.

FIG. 4 is a flow diagram of an example method 400 that can be used to implement the example torque overlay system 300 of FIG. 3. The example method 400 may be implemented to increase or decrease a total steering assist applied to a steering gear (e.g., the total steering assist shown in FIG. 2).

The example method 400 begins by collecting vehicle sensor data (block 402). In some examples, data may be collected from one or more of the example steering velocity sensor 305, the example steering angle sensor 310, the example torque sensor 315, the example vehicle speed sensor 320, the example engine torque sensor 325, and/or the RPM input 350 of FIG. 3. In some examples, data may be collected from other sensors (e.g., pressure sensors) in addition to or in place of the example sensors 305-325 and the RPM input 350.

The example method 400 includes selecting modifiers to be used by the torque overlay system 300 (block 404). In some examples, the modifiers may be selected by a torque modifier such as the example torque modifier 140 of FIGS. 1-3. In some examples, two or more of the example pressure modifier 335, the example steering angle modifier 340, the example steering velocity modifier 345, and/or the example engine RPM modifier 365 of FIG. 3 may be selected. In some alternative examples, only one modifier may be selected at block 404.

The example method 400 includes determining whether the pressure modifier has been selected (block 406). For example, the torque overlay system 300 may determine that the pressure modifier 335 has been selected (e.g., the torque modifier 140 selects the example pressure modifier 335 at block 404). If, at block 406, the example torque overlay system 300 determines that the example pressure modifier 335 has been selected, control proceeds to block 408 to calculate a steering pressure. If, at block 406, the example torque overlay system 300 determines that the example pressure modifier 335 has not been selected, control proceeds to block 410 to determine if an engine RPM modifier has been selected.

At block 408 of the example method 400, the steering pressure is calculated. In some examples, the steering pressure circuit 330 of FIG. 3 may be used to calculate the steering pressure. For example, the example steering pressure circuit 330 may calculate the steering pressure based on sensor data. In a further example, the example steering velocity sensor 305, the example steering angle sensor 310, the example torque sensor 315, the example vehicle speed sensor 320, and the example engine torque sensor 325 may be used by the example steering pressure circuit 330 to calculate the steering pressure. In some alternative examples, the steering pressure may be found at block 408 using a pressure sensor.

At block 410 of the example method 400, the example torque overlay system 300 determines whether the example engine RPM modifier 365 has been selected. For example, the torque overlay system 300 may determine that the engine RPM modifier 365 has been selected (e.g., the torque modifier 140 selects the example engine RPM modifier 365 at block 404). If, at block 410, the example torque overlay system 300 determines that the example engine RPM modifier 365 has been selected, the example method 400 proceeds to block 412 to map engine performance. If, at block 410, the example torque overlay system 300 determines that the example engine RPM modifier 365 has not been selected, control proceeds to block 414 of the example method 400.

The example method 400 includes mapping engine performance (block 412). The example map 360 of FIG. 3 may be used to map engine performance based on sensor data. In some examples, the example map 360 may be based on inputs from an engine torque sensor such as the example engine torque sensor 325 of FIG. 3, the steering pressure calculated by the example steering pressure circuit 330, and/or an RPM input such as the example RPM input 350 of FIG. 3. In such examples, the example steering pressure circuit 330 may calculate the steering pressure using the methods implemented at block 408. In some alternative examples, the example map 360 is based on only the example RPM input 350.

The example method 400 includes calculating modifier values for the selected modifiers (block 414). At block 414, each modifier value may be calculated based on an input or inputs to the selected modifier. For example, the example steering angle modifier 340 may be calculated based on a steering angle input from the example steering angle sensor 310. In another example, the example engine RPM modifier 365 may be calculated based on the example map 360. In example method 400, the modifier values calculated at block 414 may have positive or negative values (e.g., a positive modifier value increases torque and a negative modifier value decreases torque). In some examples, the modifier values may be calculated using look-up tables. In some alternative examples in which only one modifier may be selected at block 404, block 414 may include calculating the modifier value of the selected modifier only.

The example method 400 includes calculating a torque modifier value (block 416). In some examples, the torque modifier value may be calculated by summing the selected modifier values calculated at block 414. In some alternative examples, the modifier values may be combined using other methods (e.g., multiplying the modifier values, averaging the modifier values, etc.). In some examples, only a single modifier may be selected at block 404. In such examples, the torque modifier value calculated at block 414 may be equal to the modifier value of the selected modifier.

The example method 400 includes determining a final torque assist (block 418). In some examples, the final torque assist is determined based on the torque modifier value calculated at block 416 and a base torque assist such as the example base torque assist 380 of FIG. 3. In some examples, the base torque assist may be a torque applied to a steering system of a vehicle without any modifications (e.g., modifier values from the example torque modifier 140). In such examples, the base torque assist may be applied by a torque overlay unit, such as the example torque overlay unit 125 of FIG. 1. In some examples, the base torque assist may be a constant value.

The example method 400 includes applying the final torque assist to an input shaft (block 420). In some examples, the final torque assist determined at block 418 is applied to the example input shaft 118 of FIG. 1. In some examples, the final torque assist is applied via the example torque overlay unit 125. In such examples, an electric motor such as the example electric motor 135 of FIG. 1 may be used to apply the final torque assist to the input shaft 118 via a drive mechanism such as the example drive mechanism 130 of FIG. 1.

The example method 400 includes modifying a total steering assist based on the final torque assist (block 422). In some examples, the total steering assist is the output of a steering gear such as the example steering gear 150 of FIGS. 1 and 2. In some further examples, the total steering assist may include the final torque assist, a driver input such as the example driver input 206 of FIG. 2, and a hydraulic steering assist applied to the steering gear such as the hydraulic steering assist of the example hydraulic power steering system 232 of FIG. 2. In some examples, the total steering assist is modified by the changes to the final torque assist due to the torque modifier value.

Figure 5:
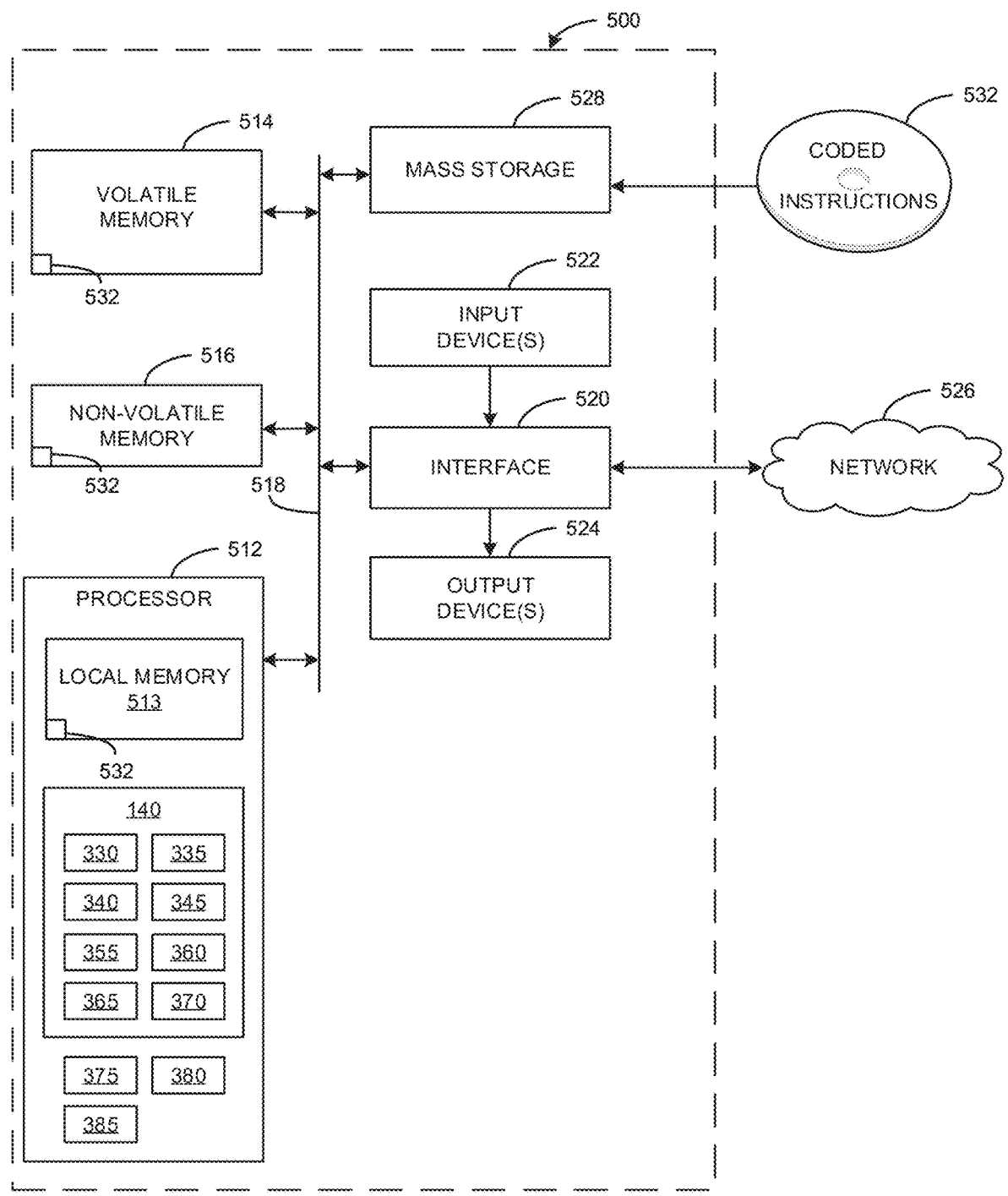
FIG. 5 is a block diagram of an example processor platform structured to execute instructions to implement the torque overlay system of FIG. 3.

FIG. 5 is a block diagram of an example processor platform 500 structured to execute instructions to implement the torque overlay system 300 of FIG. 3. The processor platform 500 may be, for example, an engine control unit, an automotive computer, a server, a personal computer, or any other type of computing device.

The processor platform 500 of the illustrated example includes a processor 512. The processor 512 of the illustrated example is hardware. For example, the processor 512 may be implemented by one or more integrated circuits, logic circuits, microprocessors or controllers from any desired family or manufacturer.

The processor 512 of the illustrated example includes a local memory 513 (e.g., a cache). The processor 512 of the illustrated example executes the instructions to implement the example torque modifier 140, which includes the example steering pressure circuit 330, the example pressure modifier 335, the example steering angle modifier 340, the example steering velocity modifier 345, the example filter 355, the example map 360, the example engine RPM modifier 365, and the example summation block 370. The processor 512 of the illustrated example additionally includes the combination block 375, the base torque overlay assist 380, and the final torque overlay assist 385. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) may be implemented by, for example, an audio sensor, a microphone, a camera (still or video), a keyboard, a button, a mouse, a touchscreen, a track-pad, a trackball, isopoint, and/or a voice recognition system.

One or more output devices 524 are also connected to the interface circuit 520 of the illustrated example. The output devices 524 may be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip, or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives. The mass storage device 528 may implement the one or more look-up tables described herein.

Coded instructions 532 to implement the torque overlay system 300 may be stored in the mass storage device 528, in the volatile memory 514, in the non-volatile memory 516, and/or on a removable tangible computer-readable storage medium such as a CD or DVD.

From the foregoing, it will be appreciated that methods, apparatus, and articles of manufacture to regulate a vehicle steering system have been disclosed that modify a steering assist (i.e., an amount of torque applied to the steering system to aid a driver in turning the vehicle) in response to driver inputs and/or changes in driving conditions. For example, overheating, undesired steering system effort variation, and/or increases in vehicle steering pressure may cause unwanted deterioration and increases in upkeep costs (e.g., cost of replacing vehicle parts, cost of servicing a vehicle, etc.). In some examples, these undesired effects may be caused by traveling near end lock position, traveling on high-friction surfaces, driving at idle speeds, varying engine speed, and/or any other driving circumstances causing an increase in pressure or temperature in the vehicle steering system.

Some examples disclosed herein modify the steering assist based on steering angle, steering velocity, steering pressure, and/or engine performance. Further, some disclosed examples combine multiple modifier values to fine-tune the modification to the steering assist (e.g., a torque modifier value), preventing the steering system from experiencing overheating, high pressures, and/or other undesirable effects. Further still, some examples may modify the steering assist in such a way as to make turning a steering wheel of the vehicle easier (i.e., the modification increases the steering assist) or more difficult (i.e., the modification decreases the steering assist) for the driver. Such modifications allow the driver to feel a more consistent steering effort and maintain better control of the vehicle. Additionally, these modifications prevent damage caused by holding the vehicle wheels at or near the end stops. Further still, some disclosed examples eliminate the need for adding a pressure sensor by calculating a steering pressure using other sensor data.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus comprising:
a torque modifier to:
calculate modifier values based on sensor data of a vehicle;
calculate a torque modifier value based on the modifier values;
an electronic control unit to generate a final torque assist based on the torque modifier value and a base torque assist; and
a torque overlay unit to apply the final torque assist to a steering system of the vehicle.

2. The apparatus of claim 1, wherein the sensor data of the vehicle includes one or more of steering velocity data, steering angle data, steering torque data, vehicle speed data, engine torque data, or engine RPM data.

3. The apparatus of claim 1, wherein one of the modifier values is a steering angle modifier value based on a steering angle of the vehicle, the steering angle modifier value decreasing when the steering angle increases.

4. The apparatus of claim 1, wherein one of the modifier values is a steering velocity modifier value based on a steering velocity, the steering velocity modifier value to decrease when the steering velocity increases.

5. The apparatus of claim 1, wherein one of the modifier values is a pressure modifier value based on a calculated steering pressure, the pressure modifier value to decrease when the calculated steering pressure increases.

6. The apparatus of claim 1, wherein one of the modifier values is an engine RPM modifier value based on a calculated engine performance, the engine RPM modifier value to decrease when the calculated engine performance increases.

7. A non-transitory computer readable storage medium comprising instructions that, when executed, cause a machine to at least:
calculate modifier values based on sensor data of a vehicle;
calculate a torque modifier value based on the modifier values; and
generate a final torque assist based on the torque modifier value and a base torque assist, the final torque assist to be applied to a steering system of the vehicle.

8. The non-transitory computer readable storage medium of claim 7, wherein the sensor data of the vehicle includes one or more of steering velocity data, steering angle data, steering torque data, vehicle speed data, engine torque data, or engine RPM data.

9. The non-transitory computer readable storage medium of claim 7, wherein the final torque assist is to be applied by a torque overlay unit coupled to an input shaft of a steering gear of the steering system, the torque overlay unit including an electric motor and a drive mechanism.

10. The non-transitory computer readable storage medium of claim 7, wherein one of the modifier values is a steering angle modifier value based on a steering angle of the vehicle, the steering angle modifier value to decrease when the steering angle increases.

11. The non-transitory computer readable storage medium of claim 7, wherein one of the modifier values is a steering velocity modifier value based on a steering velocity, the steering velocity modifier value to decrease when the steering velocity increases.

12. The non-transitory computer readable storage medium of claim 7, wherein one of the modifier values is a pressure modifier value based on a calculated steering pressure, the pressure modifier value to decrease when the calculated steering pressure increases.

13. The non-transitory computer readable storage medium of claim 7, wherein one of the modifier values is an engine RPM modifier value based on a calculated engine performance, the engine RPM modifier value to decrease when the calculated engine performance increases.

14. A method comprising:
calculating modifier values based on sensor data of a vehicle;
calculating a torque modifier value based on the modifier values; and
generating a final torque assist based on the torque modifier value and a base torque assist, the final torque assist to be applied to a steering system of the vehicle.

15. The method of claim 14, wherein the sensor data of the vehicle includes one or more of steering velocity data, steering angle data, steering torque data, vehicle speed data, engine torque data, or engine RPM data.

16. The method of claim 14, wherein the final torque assist is to be applied by a torque overlay unit coupled to an input shaft of a steering gear of the steering system, the torque overlay unit including an electric motor and a drive mechanism.

17. The method of claim 14, wherein one of the modifier values is a steering angle modifier value based on a steering angle of the vehicle, the steering angle modifier value to decrease when the steering angle increases.

18. The method of claim 14, wherein one of the modifier values is a steering velocity modifier value based on a steering velocity, the steering velocity modifier value to decrease when the steering velocity increases.

19. The method of claim 14, wherein one of the modifier values is a pressure modifier value based on a calculated steering pressure, the pressure modifier value to decrease when the calculated steering pressure increases.

20. The method of claim 14, wherein one of the modifier values is an engine RPM modifier value based on a calculated engine performance, the engine RPM modifier value to decrease when the calculated engine performance increases.

* * * * *